(12) United States Patent
Förster

(10) Patent No.: US 7,240,559 B2
(45) Date of Patent: Jul. 10, 2007

(54) MANOMETER

(76) Inventor: Steffen Förster, Sägeweg 26, Neuenburg (DE) 79395

( * ) Notice: Subject to any disclaimer, the term of this patent is extended or adjusted under 35 U.S.C. 154(b) by 0 days.

(21) Appl. No.: 11/210,469

(22) Filed: Aug. 24, 2005

(65) Prior Publication Data
US 2006/0081060 A1 Apr. 20, 2006

(30) Foreign Application Priority Data
Oct. 20, 2004 (DE) .................. 10 2004 051 032

(51) Int. Cl.
*G01L 7/04* (2006.01)
(52) U.S. Cl. .......................... 73/732; 73/741
(58) Field of Classification Search ............ 73/732, 73/741
See application file for complete search history.

(56) References Cited
U.S. PATENT DOCUMENTS

| 2,803,138 | A | * | 8/1957 | Strobl | .......................... 73/431 |
| 3,520,192 | A | * | 7/1970 | Condie | ........................ 73/738 |
| 3,630,089 | A | | 12/1971 | Bisell et al. | |
| 6,044,712 | A | * | 4/2000 | Cannet et al. | ................ 73/741 |

FOREIGN PATENT DOCUMENTS

| DE | 72 071 048 | 2/1972 |
| DE | 78 23 994 | 8/1978 |
| DE | 83 31 077.0 | 10/1983 |
| DE | 87 05 784.0 | 7/1987 |
| DE | 298 12 768 | 7/1998 |
| DE | 101 23 103 | 11/2002 |

* cited by examiner

Primary Examiner—Andre J. Allen
(74) Attorney, Agent, or Firm—Martin Fleit; Paul D. Bianco; Fleit Kain Gibbons Cutman Bongini & Bianco P.L.

(57) ABSTRACT

The invention relates to a manometer with a housing, a connecting piece rigidly connected to the housing, a bourdon tube arranged in the housing, a viewing glass fixed on the housing, and a pointer, which can rotate on the inside of the viewing glass and which is engaged with a free end of the bourdon tube, wherein the housing has on its top side a connecting piece that is bent inwardly for connecting to the viewing glass. To simplify the assembly, several cutouts distributed over the periphery are arranged in the connecting piece of the housing for engagement of an assembly tool, wherein the housing is connected to the connecting piece with a positive fit.

10 Claims, 3 Drawing Sheets

MANOMETER

FIELD OF THE INVENTION

The invention relates to a manometer.

BACKGROUND OF THE INVENTION

Such a manometer is known from DE 101 23 103 A1. This has a housing with a bourdon tube arranged therein, a connecting piece rigidly connected to the housing, a viewing glass arranged on the housing, and a pointer that can rotate at the bottom side of the viewing glass. The pointer is in engagement with the free end of the bourdon tube. The connecting piece of this known manometer has threads on its outer side. The manometer is fixed, e.g., in a fire extinguisher valve, by means of these threads. The screwing on and tightening of the manometer is typically realized by means of a hexagonal head, which is provided on the outer side of the connecting piece. By means of a commercially available wrench, the manometer can then be fixed by hand. However, this type of mounting has the disadvantage that automatic assembly is not possible without additional means.

SUMMARY OF THE INVENTION

An object of the invention is the design of a manometer of the type named above, which can be easily and economically produced and which also enables simple automatic assembly.

This object is achieved by a manometer as set in the claims. Advantageous embodiments of the invention are also recited in the claims.

In the manometer according to the invention, there are several cutouts for engaging an assembly tool placed over the periphery in the connecting piece of the housing, which is bent over or crimpled for attachment of the viewing glass. In addition, the connecting piece is connected to the housing with a positive fit. This arrangement enables assembly from the front or from above. A suitable assembly tool engages in the cutout, so that automatic assembly with a torque wrench or a similar tool is possible.

In one configuration of the invention that is especially preferred in terms of production, the positive-fit connection is achieved by projections on the housing. These projections engage in a corresponding groove on the connecting piece.

In the not-yet assembled state of the housing, i.e., with a connecting piece that has not yet been crimped, the cutouts in the connecting piece have diagonally inwardly converging side edges. Therefore, after the crimpling of the connecting piece, the cutouts have a rectangular cross section for right-angle engagement of an assembly tool.

BRIEF DESCRIPTION OF THE DRAWINGS

Additional details and advantages of the invention result from the following description of a preferred embodiment with reference to the drawing. Shown are.

DETAILED DESCRIPTION OF THE INVENTION

Figure 1:
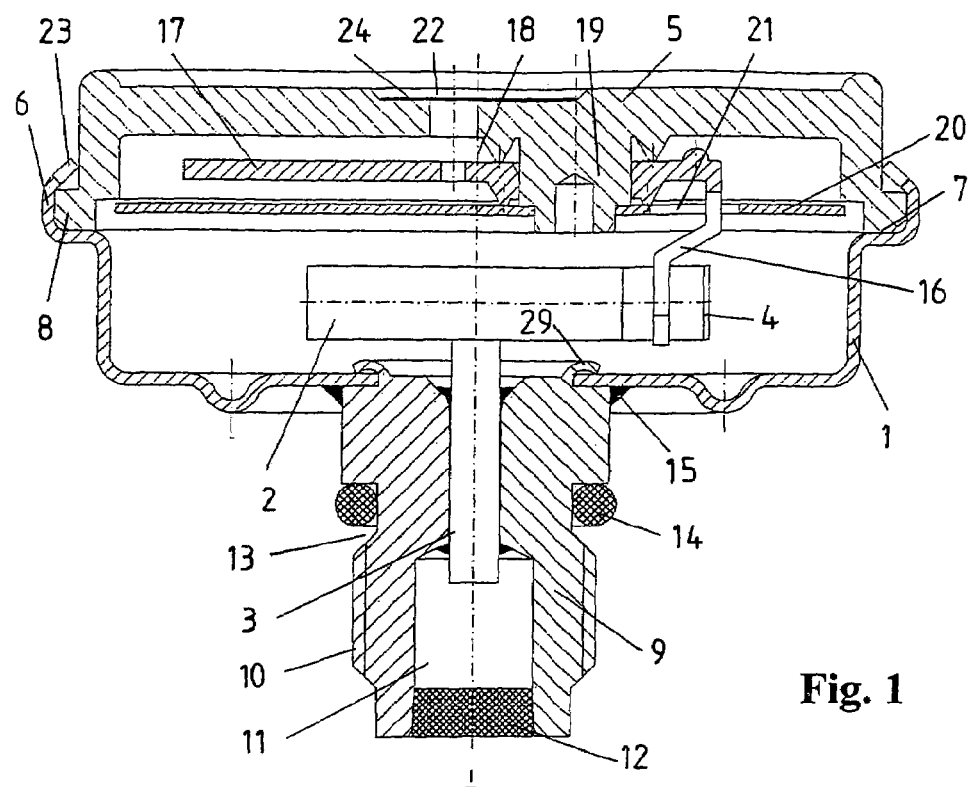
FIG. 1, a manometer in longitudinal section.
Figure 2:
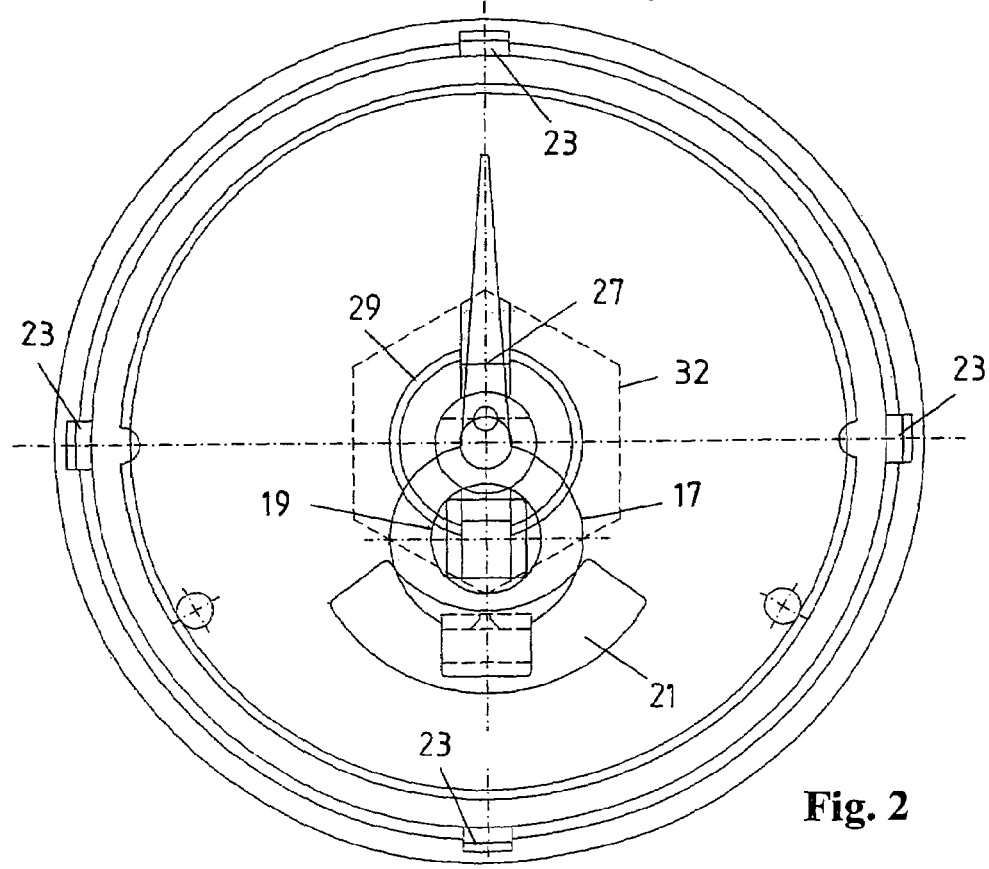
FIG. 2, the manometer shown in FIG. 1 in a plan view.
Figure 4:
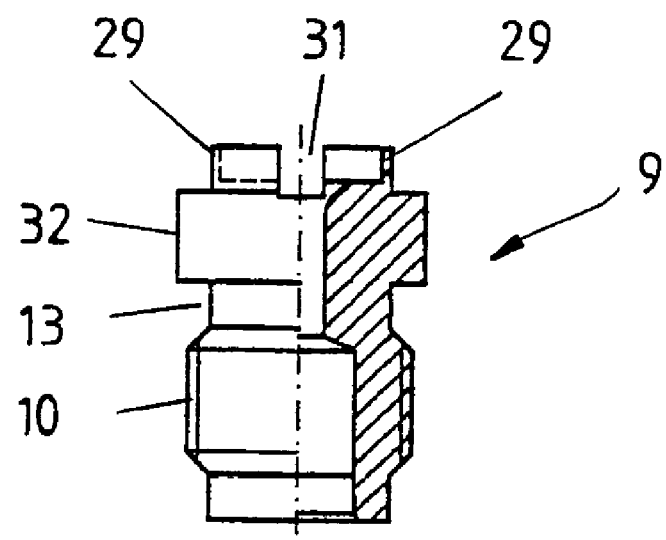
Figure 4:
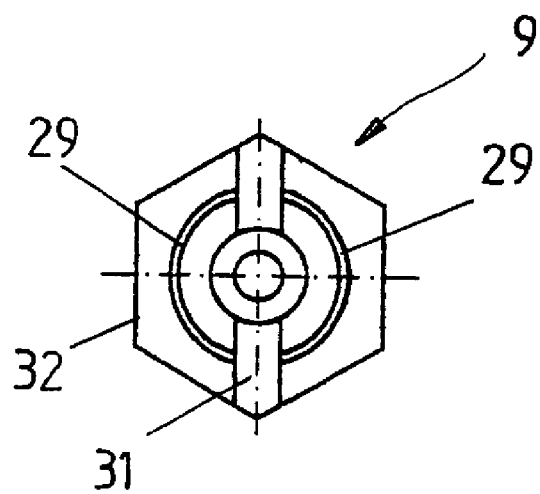

The manometer shown in FIGS. 1 and 2 in longitudinal section and a plan view contains a bowl-shaped housing 1, in which is arranged a spiral-shaped bent bourdon tube 2 with an open end 3 fixed to the housing and a freely movable closed end 4. The housing 1 is covered on its top side by a circular viewing glass 5. For fixing the viewing glass 5 to the housing 1, the housing 1, which is configured as a sheet-metal part, has on its top side a surrounding connecting piece 6 and an annular surface 7 for support of the viewing glass 5. The connecting piece 6 is flanged inwards when the manometer is assembled and presses against the viewing glass 5 on an outer annular shoulder 8, whereby this glass is held. On the bottom side of the housing 1, a connecting piece 9 shown separately in FIG. 4 is attached. The connecting piece 9 has on its outer side threads 10 for fixing the manometer in a bore of a component, e.g., a fire extinguisher, under pressure. A bore 11 connected to the open end 3 of the bourdon tube 2 is arranged in the connecting piece 9. By means of this bore, the interior of the bourdon tube 2 can be charged with the pressure to be measured. A filter 12 can be inserted in the bore 11 of the connecting piece 9. The connecting piece 9 further contains on its outer side an annular groove 13 for a sealing ring 14. At the transition between the connecting piece 9 and the housing 1, a sealing flange 15 made from a suitable joining material for sealing is also affixed.

The closed free end 4 of the bourdon tube 2 is angled and engages between two laterally flexible legs of a downwardly projecting connecting part 16 of a pointer 17, which can rotate on a journal 19 offset laterally relative to the center axis 18 of the manometer. The journal 19 for the pointer 17 is formed integrally with the viewing glass 5 on the bottom side of this panel. A display or dial face 20 provided with a display scale is also set locked in rotation on the journal 19. The pointer 17 is arranged so that it can rotate freely between the viewing glass 5 and the display or dial face 20. The display or dial face 20 has a cutout 21 adapted to the turning range of the pointer 17. The connecting part 16 of the pointer 17 extends through this cutout. An adhesive film 24 is applied in a center cutout 22 of the viewing glass 16 [sic; 5].

Figure 3:
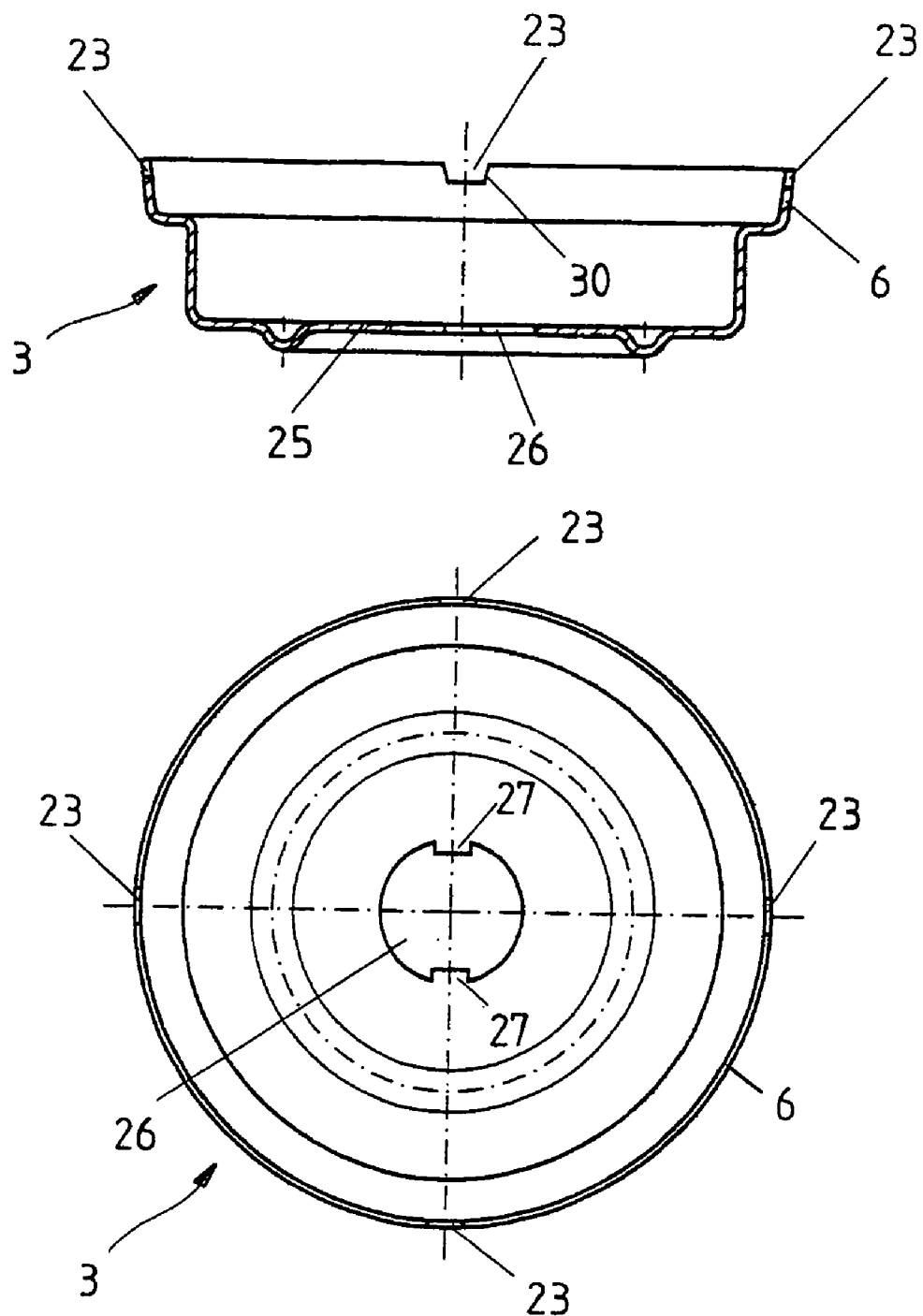
FIG. 3, the housing of the manometer shown in FIG. 1 in longitudinal section and a plan view, and FIG. 4, the connecting piece of the manometer shown in FIG. 1 in longitudinal section and a plan view.

In FIG. 3, the housing 1 formed as a sheet-metal part is shown in the not-yet assembled state. In this state, the surrounding connecting piece 6 projects directly upwards. Four cutouts 23 distributed uniformly over the periphery are provided in the connecting piece 6. As follows from the top view of FIG. 2, the cutouts 23 have slightly inclined side edges 30. The side edges 30 converge diagonally inwardly, so that the cutouts 23 become narrower. Therefore, the cutouts 23 have a rectangular cross section following the flange on the connecting piece 6 and thus enable the right-angle engagement of an assembly tool. A center opening 26 for holding the connecting piece 9 is formed in the base 25 of the housing 1. Two opposing projections 27 for engagement in a groove 31 that can be seen in FIG. 4 on the top side of the connecting piece 9 are provided on the opening 26. In this way, a rotationally locked connection between the housing 1 and the connecting piece 9 is achieved.

As follows from FIG. 4, the groove 31 extends between two upwardly projecting annular segment-shaped connecting pieces 29, which are flanged outwardly for connecting the connecting piece 9 to the housing 1, as shown in FIG. 1.

Underneath the connecting piece 29, the connecting piece 9 has a hexagonal section 32, under which the annular groove 13 for the sealing ring 14 is located. Beneath the annular groove 13 is a threaded section with external threads 10.

To assemble the manometer, the housing 1 is set on the connecting piece 9, so that the projections 27 engage in the groove 31. Then the two connecting pieces 29 of the connecting piece 9 are crimped, whereby a fixed connection secured against twisting is produced between the housing 1 and the connecting piece 9. The pointer 17 is set on the journal 19 projecting inwardly from the viewing glass 5. For this purpose, this journal contains a pointer holding region, whose outer diameter is adapted to the inner diameter of a bore of the pointer 17. The journal 19 also contains an end region with a smaller diameter, on which the display or dial face 20 is locked in rotation. After the display or dial face 20 has been aligned, the end region of the journal can be deformed, e.g., by means of a hot-welding or ultrasonic welding method, such that the display or dial face 20 is locked in rotation with the viewing glass 5 while maintaining the movability of the pointer 9 [sic; 17] by means of the journal 11. The component produced in this way can then be inserted into the bowl-shaped housing 1, so that the connecting part 16 of the pointer 17 overlaps the free end 4 of the bourdon tube 2 with its two legs. If the tip of the pointer 17 does not align with a zero marking on the display or dial face 20, the component can be turned relative to the housing for the corresponding adjustment. After successful adjustment, the connecting piece 6 of the housing 1 is then crimped over the sight glass 5.

What is claimed is:

1. In a manometer with a housing, a connecting piece rigidly connected to the housing, a bourdon tube arranged in the housing, a viewing glass fixed on the housing, and a pointer, which can rotate on the inside of the viewing glass and which engages with a free end of the bourdon tube, the improvement wherein:

the housing has on its top side an inwardly bent connecting piece for connecting to the viewing glass;

several cutouts distributed over the periphery are arranged in the connecting piece of the housing for engagement of an assembly tool;

the housing is connected to the connecting piece with a positive fit; and the pointer is disposed on the inside of the viewing glass.

2. Manometer according to claim 1, wherein the positive-fit connection between the housing and the connecting piece is realized by means of projections, which engage in a groove of the connecting piece.

3. Manometer according to claim 1, wherein the connecting piece is connected to the housing by annular segment-shaped connecting pieces.

4. Manometer according to claim 1, wherein the cutouts have diagonally inwardly converging side edges in the not-yet assembled state of the housing.

5. Manometer according to claim 1, wherein the cutouts have a rectangular cross section in the assembled state of the hosing.

6. Manometer according to claim 1, wherein the pointer can rotate on a journal formed on the interior of the viewing glass.

7. Manometer according to claim 6, wherein a display or dial face is fixed on the journal.

8. Manometer according to claim 7, wherein the display or dial face is welded or adhered to the journal.

9. Manometer according to claim 1, wherein the connecting piece is rigidly connected to the housing by bent connecting pieces.

10. A manometer, comprising:

a housing having a top side with an inwardly bent connecting piece, said connecting piece having a periphery, being rigidly connected to said housing with a positive fit, and having several cutouts formed therein and distributed about said periphery for engagement with an assembly tool;

a bourdon tube disposed in said housing and having a free end;

a viewing glass having an inside and being fixed on said inwardly bent connecting piece; and a pointer being rotatably disposed on said inside of said viewing glass and engaging said free end of the bourdon tube.

* * * * *